(12) United States Patent  
Hopkins

(10) Patent No.: US 8,253,040 B2  
(45) Date of Patent: Aug. 28, 2012

(54) BRACKET FOR MOUNTING ELECTRICAL JUNCTION BOXES

(75) Inventor: Larry D. Hopkins, Oklahoma City, OK (US)

(73) Assignee: Larry D. Hopkins, Oklahoma City, OK (US)

( * ) Notice: Subject to any disclaimer, the term of this patent is extended or adjusted under 35 U.S.C. 154(b) by 0 days.

(21) Appl. No.: 12/480,498

(22) Filed: Jun. 8, 2009

(65) Prior Publication Data

US 2010/0288894 A1 Nov. 18, 2010

Related U.S. Application Data

(60) Provisional application No. 61/177,529, filed on May 12, 2009.

(51) Int. Cl.
*H02B 1/40* (2006.01)

(52) U.S. Cl. .......... 174/503; 248/56; 248/906; 174/505; 174/58

(58) Field of Classification Search .................. 248/906, 248/56, 71; 174/480, 481, 503, 505, 58
See application file for complete search history.

(56) References Cited

U.S. PATENT DOCUMENTS

| | | | | |
|---|---|---|---|---|
| 1,855,751 A * | 4/1932 | Buchanan | ................ | 248/231.21 |
| 2,032,636 A * | 3/1936 | Seckinger | .................... | 220/3.9 |
| 3,804,359 A * | 4/1974 | Cumber | ..................... | 248/205.1 |
| 4,447,030 A * | 5/1984 | Nattel | .......................... | 248/27.1 |
| 4,964,525 A * | 10/1990 | Coffey et al. | ................... | 220/3.9 |
| 5,141,185 A * | 8/1992 | Rumbold et al. | ............... | 248/71 |
| 5,209,444 A * | 5/1993 | Rinderer | .................... | 248/205.1 |
| 5,423,499 A * | 6/1995 | Webb | .......................... | 248/27.1 |
| 5,593,115 A * | 1/1997 | Lewis | .......................... | 248/68.1 |
| 5,810,303 A * | 9/1998 | Bourassa et al. | ............ | 248/205.1 |
| 6,765,146 B1 * | 7/2004 | Gerardo | ........................ | 174/58 |
| 6,871,827 B2 * | 3/2005 | Petak et al. | .................... | 248/300 |
| 6,956,172 B2 * | 10/2005 | Dinh | .............................. | 174/58 |
| 6,996,943 B2 * | 2/2006 | Denier et al. | ................ | 52/220.7 |
| 7,025,314 B1 * | 4/2006 | Thomas et al. | ............ | 248/205.1 |
| 7,036,782 B2 * | 5/2006 | Cheatham et al. | .......... | 248/298.1 |
| 7,053,300 B2 * | 5/2006 | Denier et al. | ................... | 174/58 |
| 7,154,040 B1 * | 12/2006 | Tompkins | ....................... | 174/50 |
| 7,271,335 B2 * | 9/2007 | Dinh | .............................. | 174/58 |
| 7,312,396 B1 * | 12/2007 | Gorman | .......................... | 174/58 |
| 7,344,115 B2 * | 3/2008 | Case | ............................. | 248/300 |
| 7,472,875 B2 * | 1/2009 | Rinderer | .................... | 248/200.1 |
| 7,572,977 B2 * | 8/2009 | Gorman | .......................... | 174/58 |
| 7,595,447 B2 * | 9/2009 | Vrame | .............................. | 174/58 |
| 7,699,283 B2 * | 4/2010 | Vrame et al. | .................. | 248/317 |
| 2004/0061033 A1 * | 4/2004 | Nicolides et al. | .......... | 248/231.9 |
| 2005/0067546 A1 * | 3/2005 | Dinh | .............................. | 248/343 |
| 2009/0173844 A1 * | 7/2009 | Huo | ................................ | 248/65 |

\* cited by examiner

*Primary Examiner* — Bradley Duckworth
(74) *Attorney, Agent, or Firm* — Dunlap Codding, P.C.

(57) ABSTRACT

A mounting bracket for spacing an electrical junction box at a distance away from a portion of a frame wall, the frame wall having a top plate, a bottom plate and one or more wall studs extending the top plate and the bottom plate, the electrical junction box having a back plate and one or more sidewalls extending from the back plate, the one or more sidewalls adapted to receive one or more electrical conduits, the mounting bracket having a back plate and an securement plate.

6 Claims, 8 Drawing Sheets

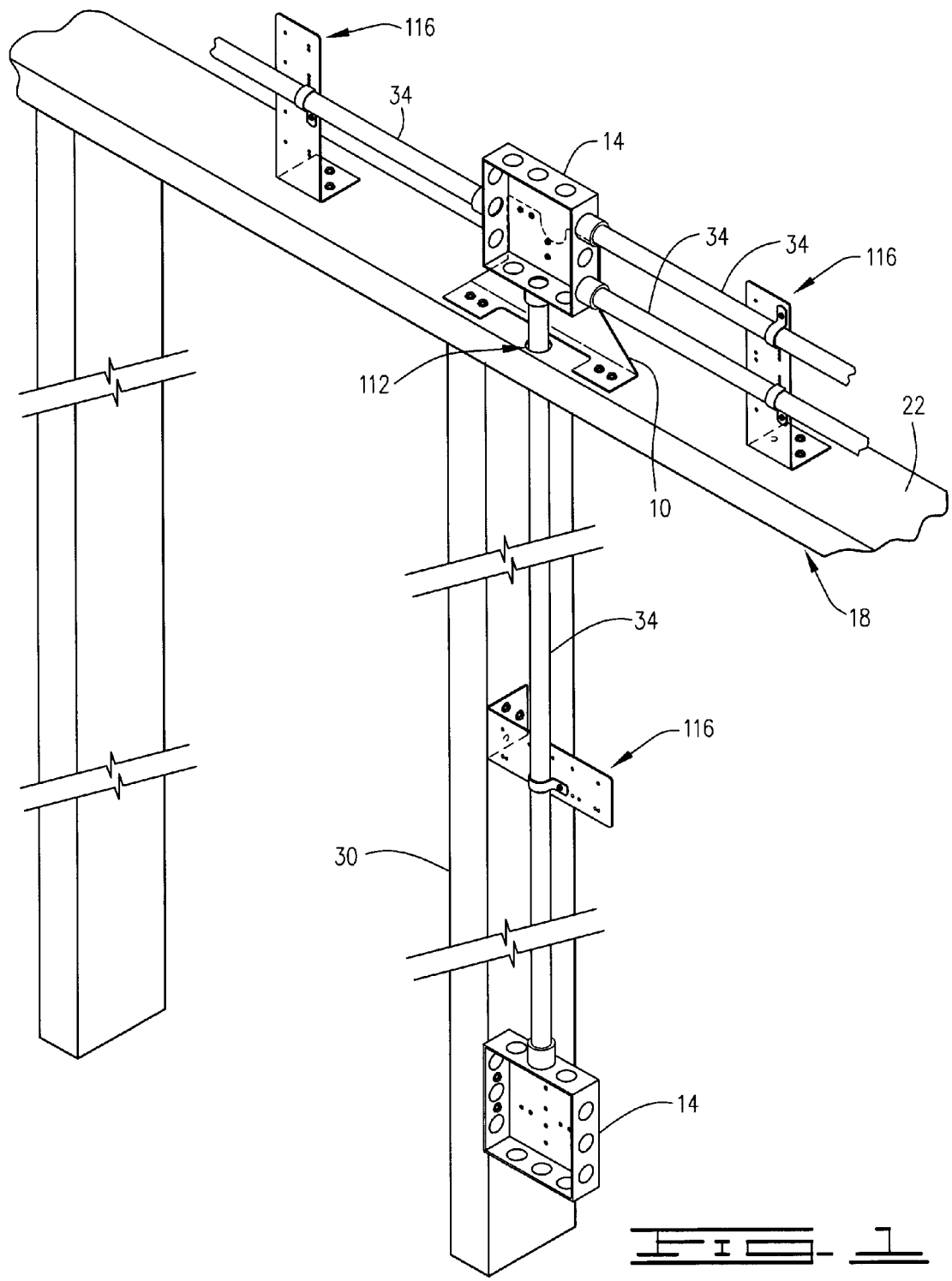

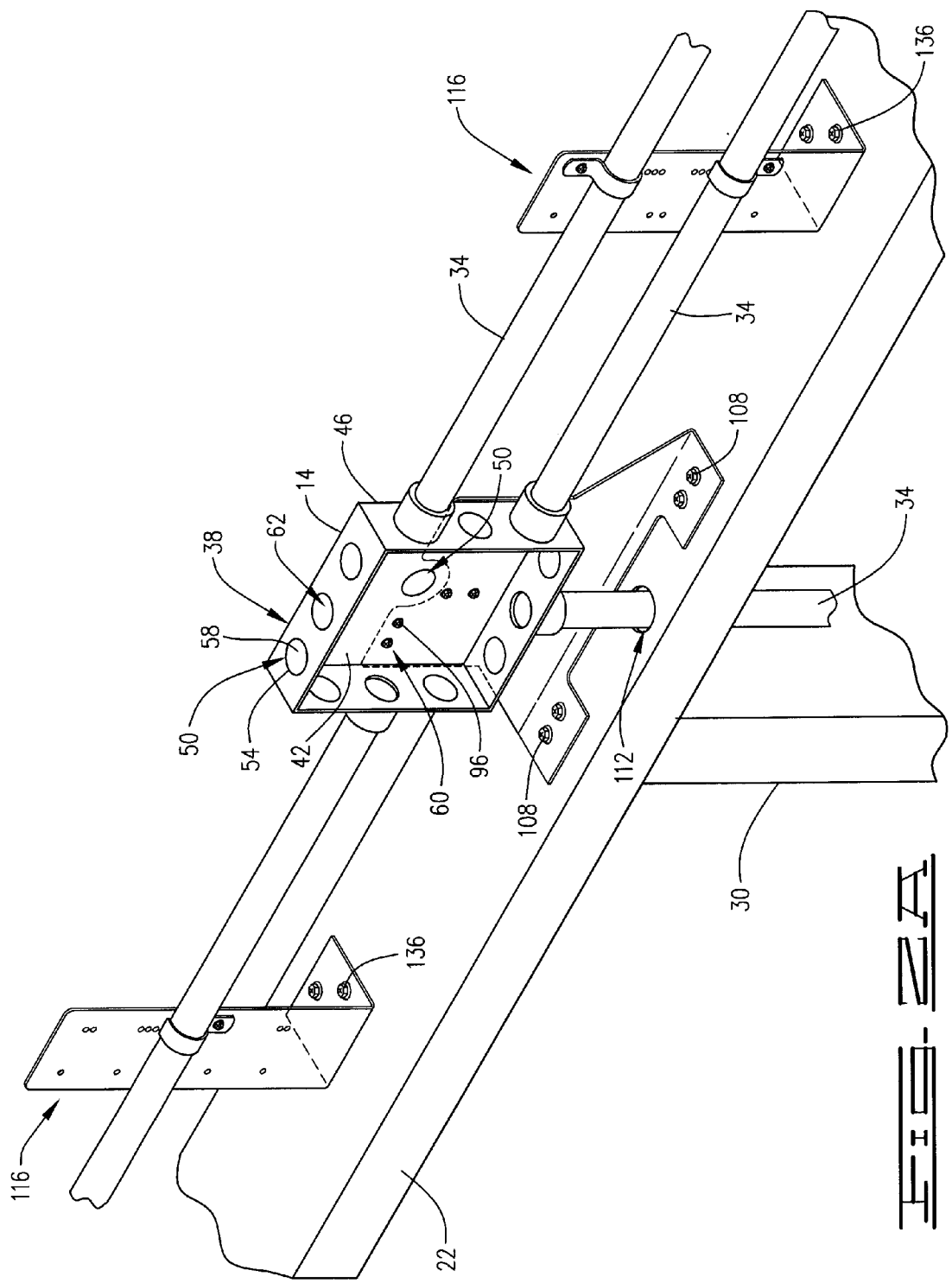

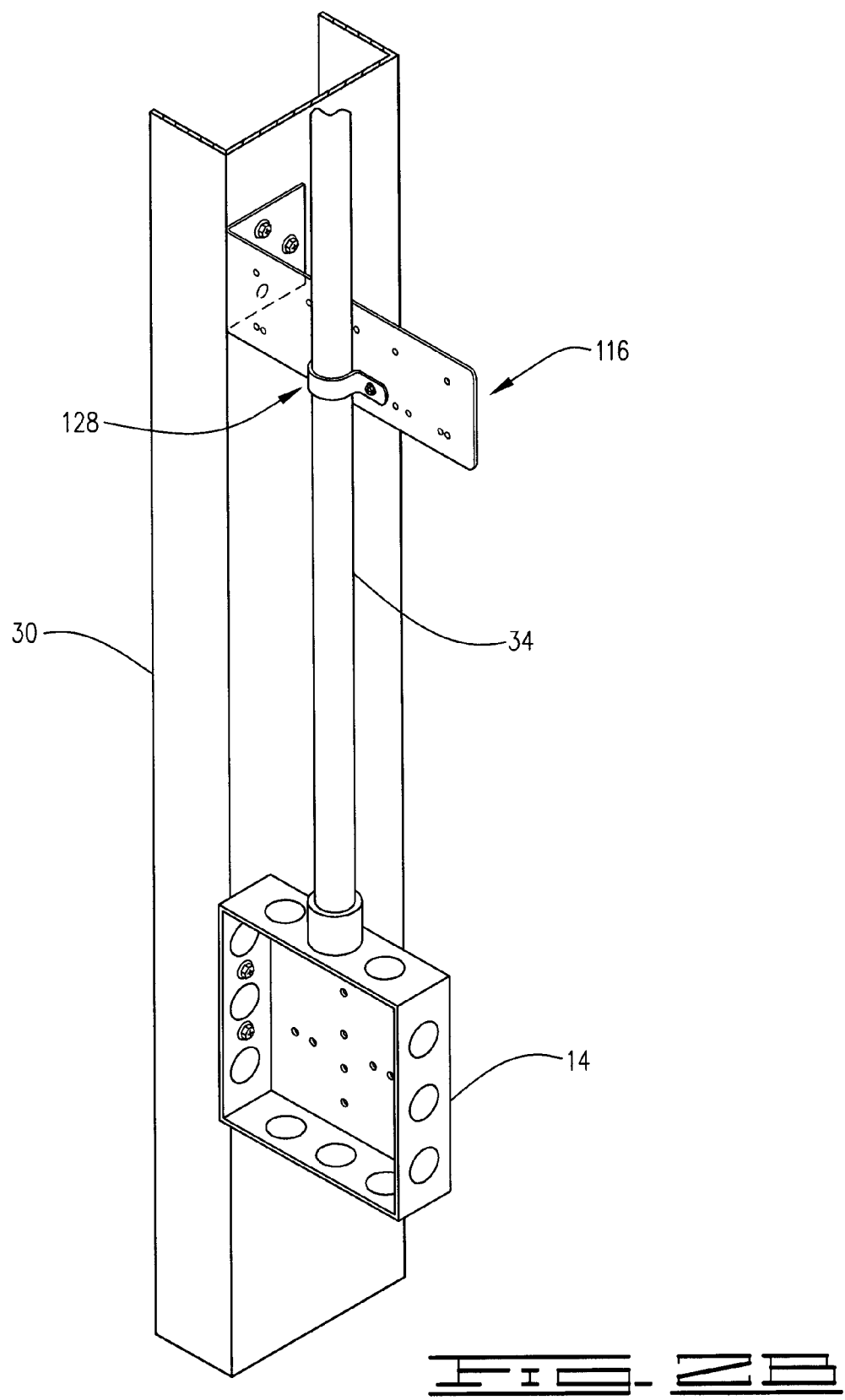

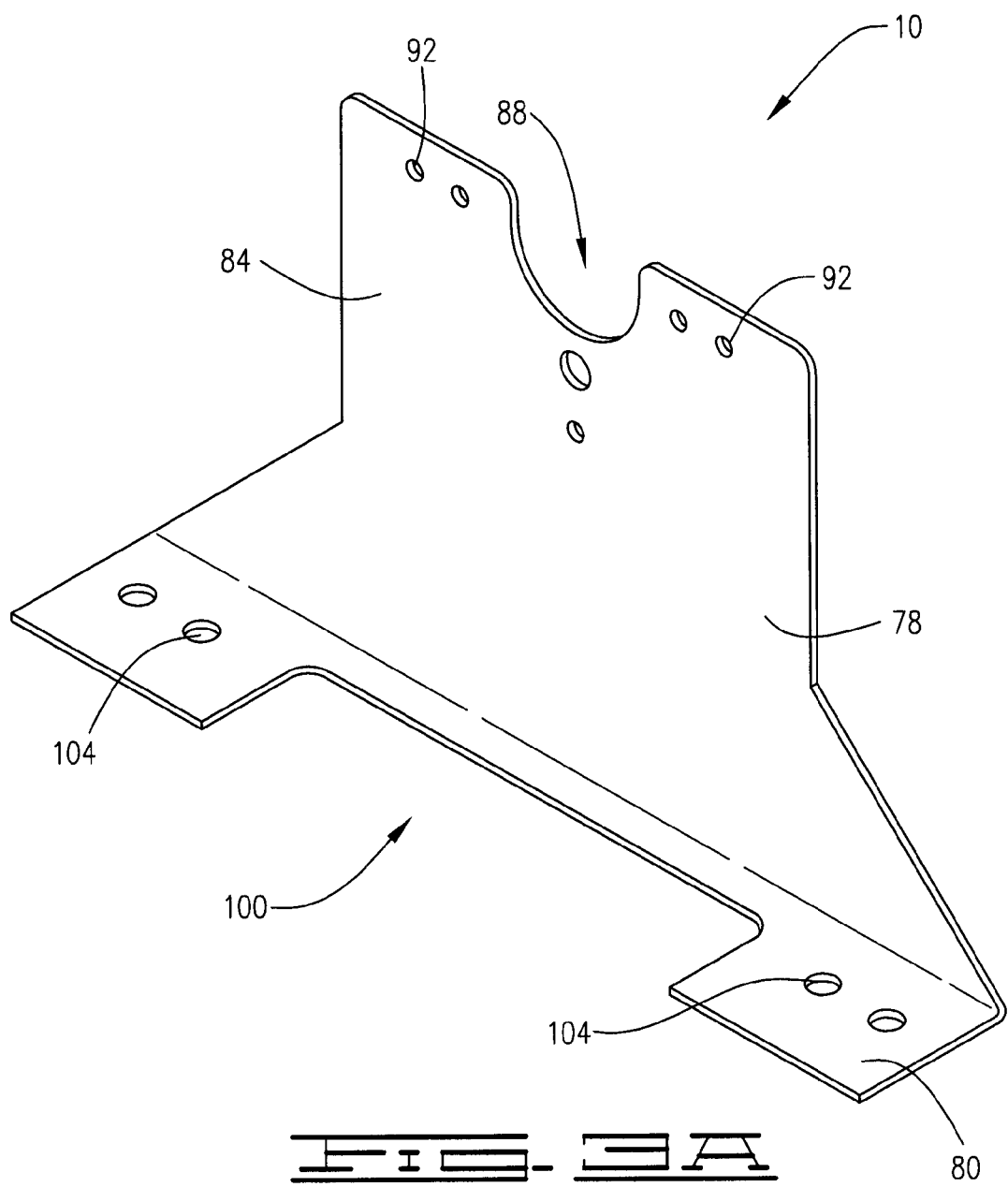

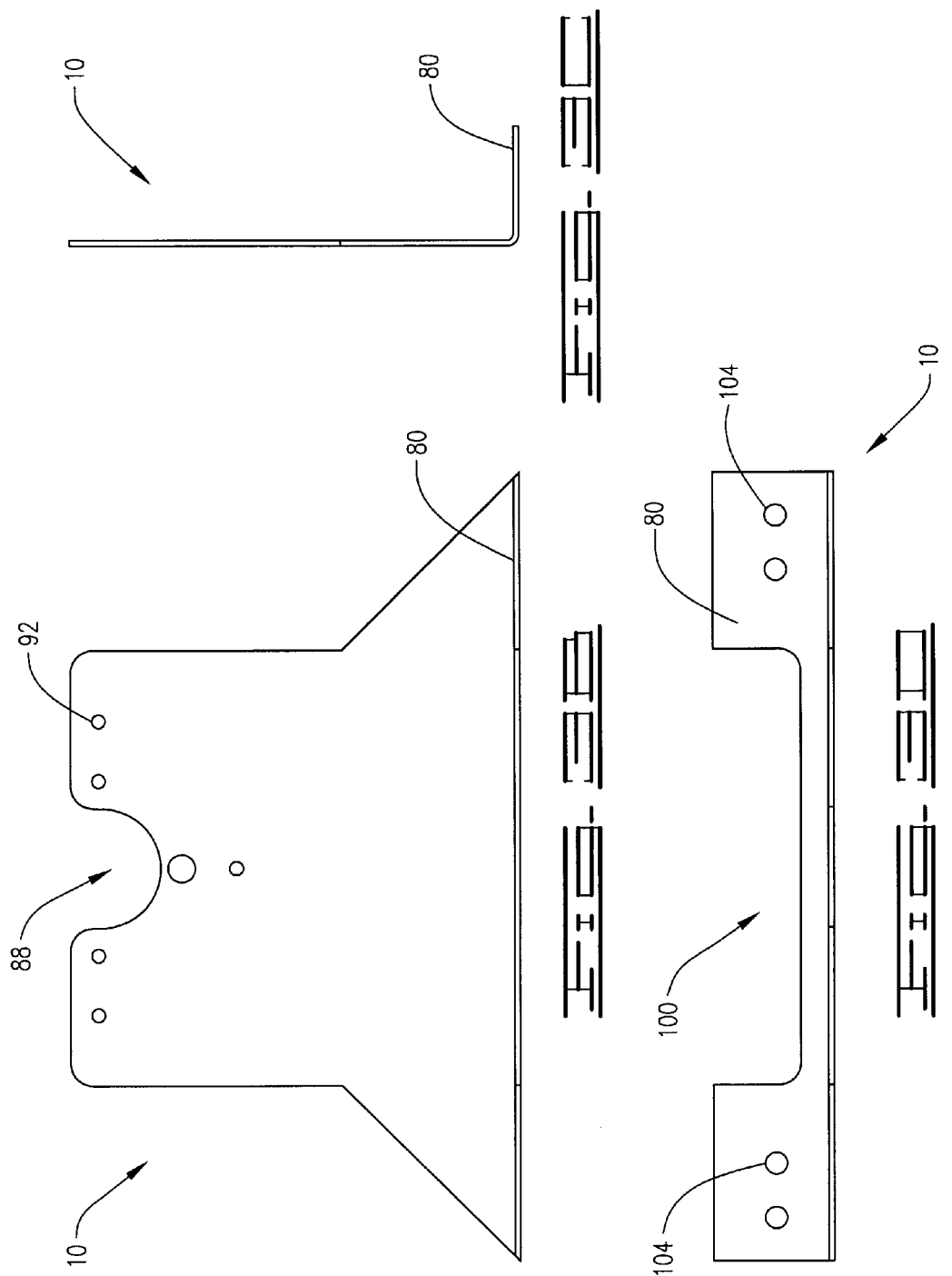

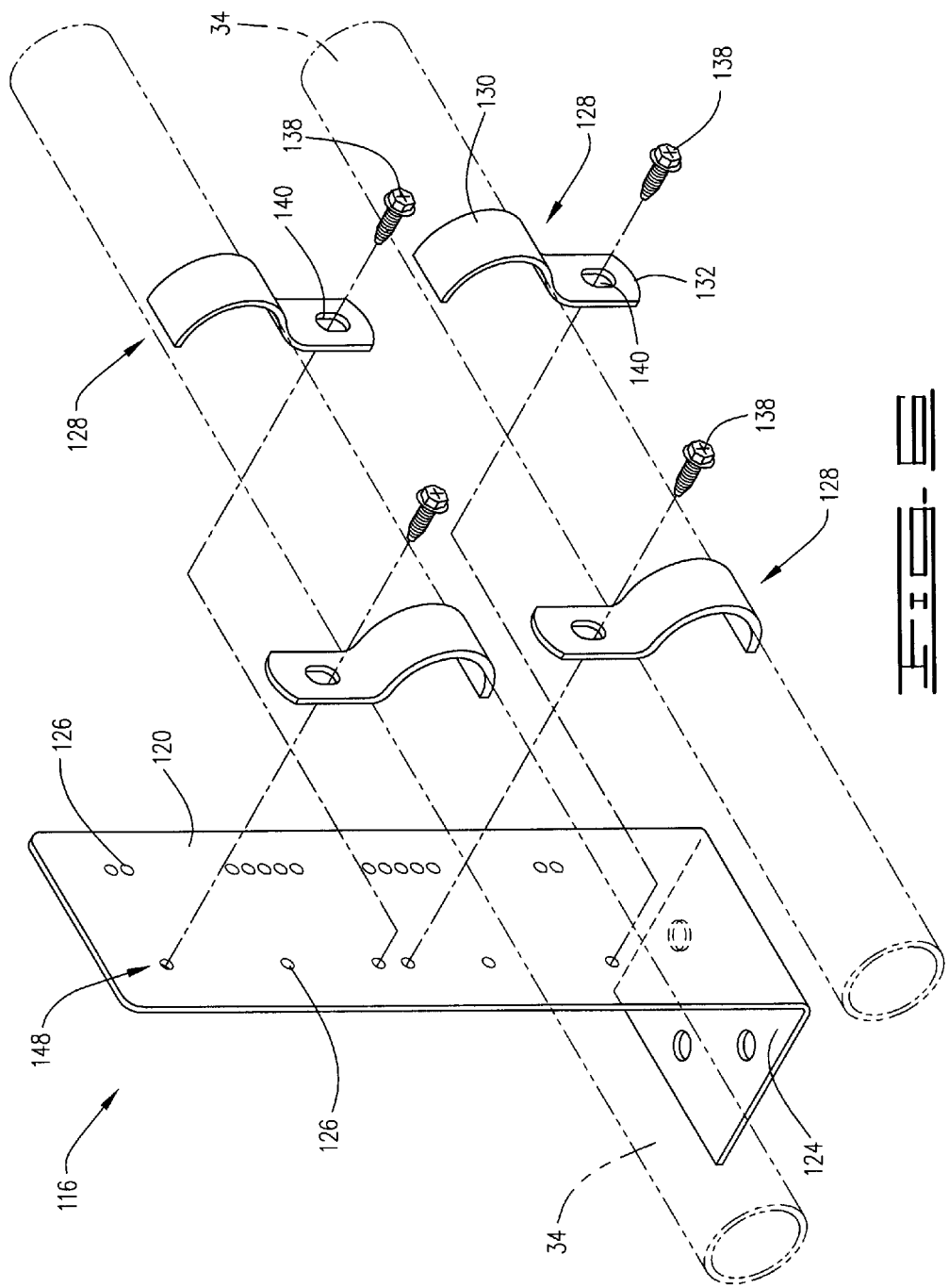

BRACKET FOR MOUNTING ELECTRICAL JUNCTION BOXES

CROSS REFERENCE TO RELATED APPLICATIONS

This application claims benefit of U.S. Provisional Application No. 61/177,529, filed May 12, 2009, which is hereby incorporated herein by reference in its entirety.

BACKGROUND OF THE INVENTION

1. Field of the Invention

This invention relates to a mounting bracket, and more particularly, but not by way of limitation, to a mounting bracket for spacing electrical junction boxes at a distance away from the framing studs of a structure, including top plates and vertical framing studs such that electrical conduits may interface with the electrical junction boxes in such a way that the electrical conduits remain unbent.

2. Brief Description of Related Art

The installation and use of electrical junction boxes is well known in the art, particularly in applications where the electrical junction boxes are used in combination with tubular metallic conduits which function to carry electrical conductor lines. While the installation of electrical junction boxes is well known, some applications require the bending of the metallic electrical conduits, for example the installation of electrical junction boxes along a wall frame of a structure.

The walls of structures are commonly constructed from framing studs fastened together to form a wall frame that typically includes a top plate and a bottom plate with wall studs extending between the top plate and the bottom plate for strength. The bottom plate is usually securely fastened to the foundation for support. Once the wall frames are securely fastened to the foundation, electrical conduits that house electrical conductor lines that provide electricity through out the structure are joined to the wall frames. Common electrical conduits used in commercial applications include rigid, IMC and EMT conduits and are constructed to interface with electrical junction boxes that act as dividing points allowing horizontally oriented electrical conduits to transition to vertically oriented electrical conduits and vice versa.

Typical electrical junction boxes include a rectangular housing formed from a back plate with sidewalls extending from the back plate. The sidewalls may have one or more punch-out apertures that receive the ends of the electrical conduits. The electrical junction boxes may or may not have a cap plate that forms an enclosure with the rectangular housing to protect the inside of the housing from debris.

The back plate of the electrical junction box is secured to the top plate of the frame wall, thereby securing the electrical junction box to the top plate in a horizontal configuration. Therefore, in order to gain access to the internal region of the electrical junction box where the electrical connections between the electrical conductor lines of the electrical conduits reside, one must be able to access the electrical junction box from above. This can prove difficult if there is little space between the top plate and the roofing of the structure.

Another common drawback with typical electrical conduits is that they must be shaped in order to interface with the electrical junction boxes. More specifically, the electrical conduit lines rest along and are securely fastened to the top plates and/or wall studs with straps as they extend along the same, from electrical junction box to electrical junction box. As such, the electrical conduits must be bent to angle from where they connect to the top plates and/or wall studs to enter the electrical junction boxes. Typical electrical conduits can be difficult to shape, thus bending the electrical conduits is a costly and time-intensive process. In fact, specialized tools are needed to form the intricate bends and curves needed to shape rigid electrical conduit.

Therefore, a need exists for a mounting bracket which allows electrical junction boxes installed in a vertical orientation rather than a horizontal configuration along the top plates and/or wall studs, the mounting bracket spacing the electrical junction boxes away from the top plates and/or wall studs at a distance which allows the electrical conduits to interface with the electrical junction boxes in such a way that the electrical conduits remain unbent. Additionally, there exists a need for a strapping bracket for supporting the electrical conduit along the top plates and/or wall studs. It is to such a mounting bracket that the present invention is directed.

BRIEF DESCRIPTION OF THE SEVERAL VIEWS OF THE DRAWINGS

FIG. 1 is a perspective view of a mounting bracket in combination with an electrical junction box receiving electrical conduits, the mounting bracket located on a top plate of a wall frame, in accordance with the present invention.

FIG. 2A is a fragmented perspective view of the FIG. 1 illustrating the mounting bracket in combination with an electrical junction box receiving electrical conduits.

FIG. 2B is a perspective view of an electrical junction box mounted on a wall stud, the electrical junction box receiving electrical conduits extending from the electrical junction box connected to the mounting bracket of FIG. 2A.

FIG. 3A is a perspective view of the mounting bracket of FIGS. 1 and 2A.

FIG. 3B is a front elevation view of the mounting bracket of FIGS. 1, 2A and 3A.

FIG. 3C is a side elevation view of the mounting bracket of FIGS. 1, 2A and 3A-3B.

FIG. 3D is a top plan view of the mounting bracket of FIGS. 1, 2A and 3A-3C.

FIG. 6 is a perspective view of a strapping bracket for use in combination with the mounting bracket, illustrating the connection of three quarter inch electrical conduits.

DETAILED DESCRIPTION OF EXEMPLARY EMBODIMENT

Figures 4A, 4B:
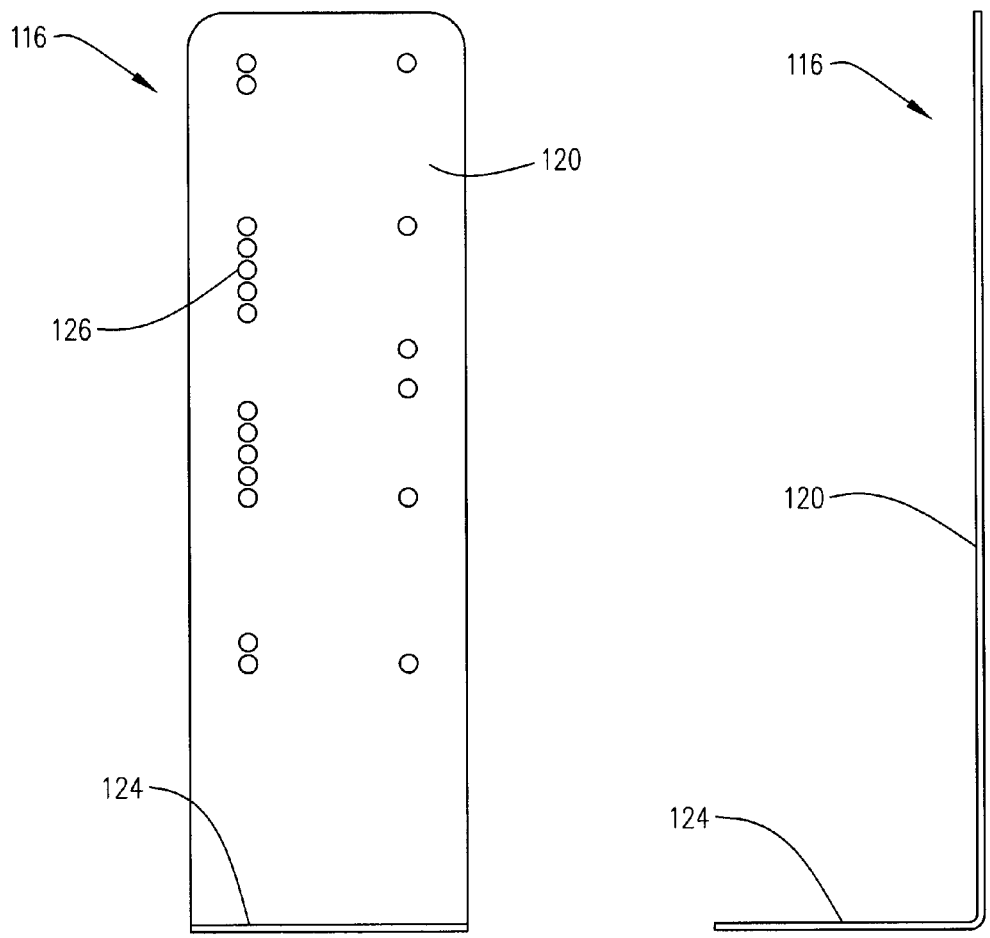
FIG. 4A is a rear elevation view of a strapping bracket for use with the mounting bracket of FIG. 1.
FIG. 4B is a side elevation view of the strapping bracket of 4A
Figure 4C:
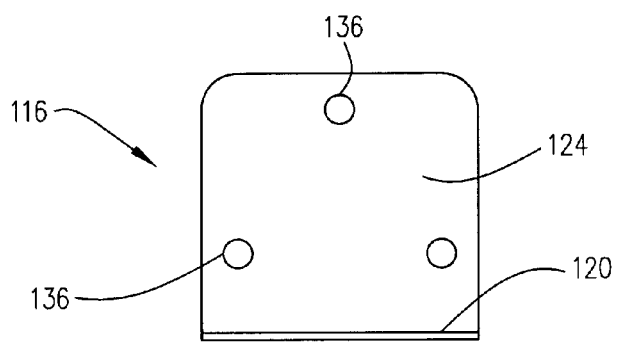
FIG. 4C is a top plan view of the strapping bracket of 4A and 4B.

Referring now to the drawings and more particularly, to FIGS. 1-2B collectively, shown therein is a mounting bracket 10 for use in mounting an electrical junction box 14 in a vertical orientation along a frame wall 18. Furthermore, the mounting bracket 10 allows the electrical junction box 14 to be spaced away from the frame wall 18 at a distance. In general, the frame wall 18 includes the top plate 22, bottom plate (not shown) and wall studs 30. The electrical junction boxes 14 are connected to the frame wall 18 via the mounting bracket 10 and interface with one or more electrical conduits 34 carrying electrical conductor lines. The electrical junction boxes 14 function as transition points which allow the electrical conduits 34 to transition from a vertical orientation to a horizontal orientation and vice versa. More particularly, the electrical junction box 14 disposed along the top plate 22 allows electrical conduits 34 running substantially parallel to the top plate 22 to transition to electrical conduits 34 that run substantially parallel to the wall stud 30.

Each of the electrical junction boxes 14 includes a housing 38 fabricated from a strong and rigid material such as a polymer, composite, fiberglass, titanium, alloy, carbon fiber (including carbon nanotube materials), any other suitably durable material, or any combinations thereof. In one embodiment, the housing 38 is provided with a base plate 42 and a sidewall 46 extending from the base plate 42. The sidewall 46 may include one or more punch outs 50 constructed by fabricating circumferential score lines 54 into the sidewall 46. The score lines 54 outline a blank 58 which may be "punched out" to reveal an opening. For example, when the punch outs 50 are impacted by a force such as when the punch outs 50 are hit with a hammer, the blank 58 separates along the score line 54 leaving an aperture 62 for receiving at least a portion of an electrical conduit 34 therethrough. Also, the base plate 42 may include one or more apertures for receiving one or more fasteners for connecting the electrical junction box 14 to the top plate 22.

Typically, the electrical junction box 14 is attached to the top plate 22 by centering the base plate 42 of the electrical junction box 14 on the top plate 22 and securing the electrical junction box 14 thereto with one or more fasteners. Such an installation disposes the electrical junction box 14 in a horizontal orientation and drastically limits access to the electrical junction box 14 such that one must access the electrical junction box 14 from above. Additionally, the electrical conduits 34 running vertically must be shaped to enter the electrical junction box 14. Such bending and shaping of the electrical conduits 34 is a costly and time intensive procedure.

Therefore, the mounting bracket 10 is positioned between the top plate 22 and the electrical junction box 14. The mounting bracket 10 allows the electrical junction box 14 to be oriented vertically such that electrical conduits 34 extending vertically may enter the electrical junction box 14 without need for bending the electrical conduit 34. Additionally, the mounting bracket 10 allows the electrical conduits 34 traveling parallel to the top plate 22 to interface with the electrical junction box 14 in an unbent configuration.

Referring now to FIGS. 3A-3D, the mounting bracket 10 is constructed of a strong and rigid material such as a polymer, composite, fiberglass, titanium, alloy, carbon fiber (including carbon nanotube materials), any other suitably durable material, or any combinations thereof. The mounting bracket 10 may be fabricated from a single sheet of metal, cut and bent to form a back plate 78 and securement plate 80. The back plate 78 includes a rectangular portion 84 sized to correspond to the shape of the electrical junction box 14. The rectangular portion 84 includes a semi-circular notch 88 and a plurality of apertures 92 for receiving one or more fasteners 96 (see FIG. 2A) that secure the electrical junction box 14 to the mounting bracket 10. When the electrical junction box 14 is joined to the mounting bracket 10, the semi-circular notch 88 allows an electrical conduit 34 to interface with a punch-out 50 disposed on the base plate 42 of the electrical junction box 14.

The rectangular portion 84 flares out at the bottom and transitions into the securement plate 80. It will be understood that the securement plate 80 may be wider relative to the back plate 78 to provide greater stability between the electrical junction box 14 and the top plate 22. The securement plate 80 includes a notch 100 and a plurality of apertures 104 for receiving one or more fasteners 108 that connect the mounting bracket 10 to the top plate 22 (see FIG. 2A). The notch 100 is sized and positioned along the securement plate 80 such that one or more electrical conduits 34 may interface with the electrical junction box 14 without interference from the securement plate 80.

It will be understood that the top plate 22 may be provided with one or more apertures 112 fabricated into the top plate 22 to allow for the electrical conduits 34 to extend from the electrical junction box 14 to another electrical junction box 14 or electrical outlet (not shown) in an unbent configuration. In one embodiment, the securement plate 80 may be positioned along the top plate 22 such that at least one of the apertures 112 of the top plate 22 are positioned within the notch 100 of the securement plate 80. (see FIGS. 1 and 2A)

To support the electrical conduits 34 as they extend between electrical junction boxes 14, one or more substantially L-shaped strapping brackets 116 may be fastened to the top plate 22 at predetermined locations. The strapping brackets 116 support the electrical conduits 34 above the top plate 22 such that the electrical conduits 34 do not sag or otherwise bend under their own weight. The strapping bracket 116 includes a back plate 120 and an securement plate 124. The strapping bracket 116 includes a plurality of vertically oriented apertures 126 that may each receive a fastener for retaining a portion of one of the electrical conduits 34 via one or more straps 128. The securement plate 124 is provided to connect the strapping bracket 116 to the top plate 22 or wall stud 30 via one or more fasteners 132 inserted through one or more apertures 136 fabricated into the securement plate 124. Although the securement plate 124 has been disclosed as being connectable to the top plate 22 via one or more fasteners, the securement plate 124 may likewise be connected to the top plate 22 via a variety of other securement means such as adhesives, rivets, nails, and the like. Furthermore, although the strapping brackets 116 have been disclosed as being substantially L-shaped, one of ordinary skill in the art will appreciate that the strapping brackets 116 may be fabricated having any number of different shapes so long as the strapping brackets 116 can support the electrical conduits 34.

Each of the straps 128 includes an arcuate portion 130 and a connector tab 132 extending from one end of the arcuate portion 130. The arcuate portion 130 is sized to receive at least a portion of one of the electrical conduits 34. Common sizes of electrical conduits 34 include, but are not limited to, half inch and three quarter inch diameter conduits. The electrical conduit 34 is captured between the arcuate portion 130 of the strap 128 and the back plate 120 of the strapping bracket 116. The electrical conduit 34 is securable to the strapping bracket 116 via a fastener 138 inserted through an aperture 140 fabricated into the connector tab 132 of the strap 128.

Figure 5:
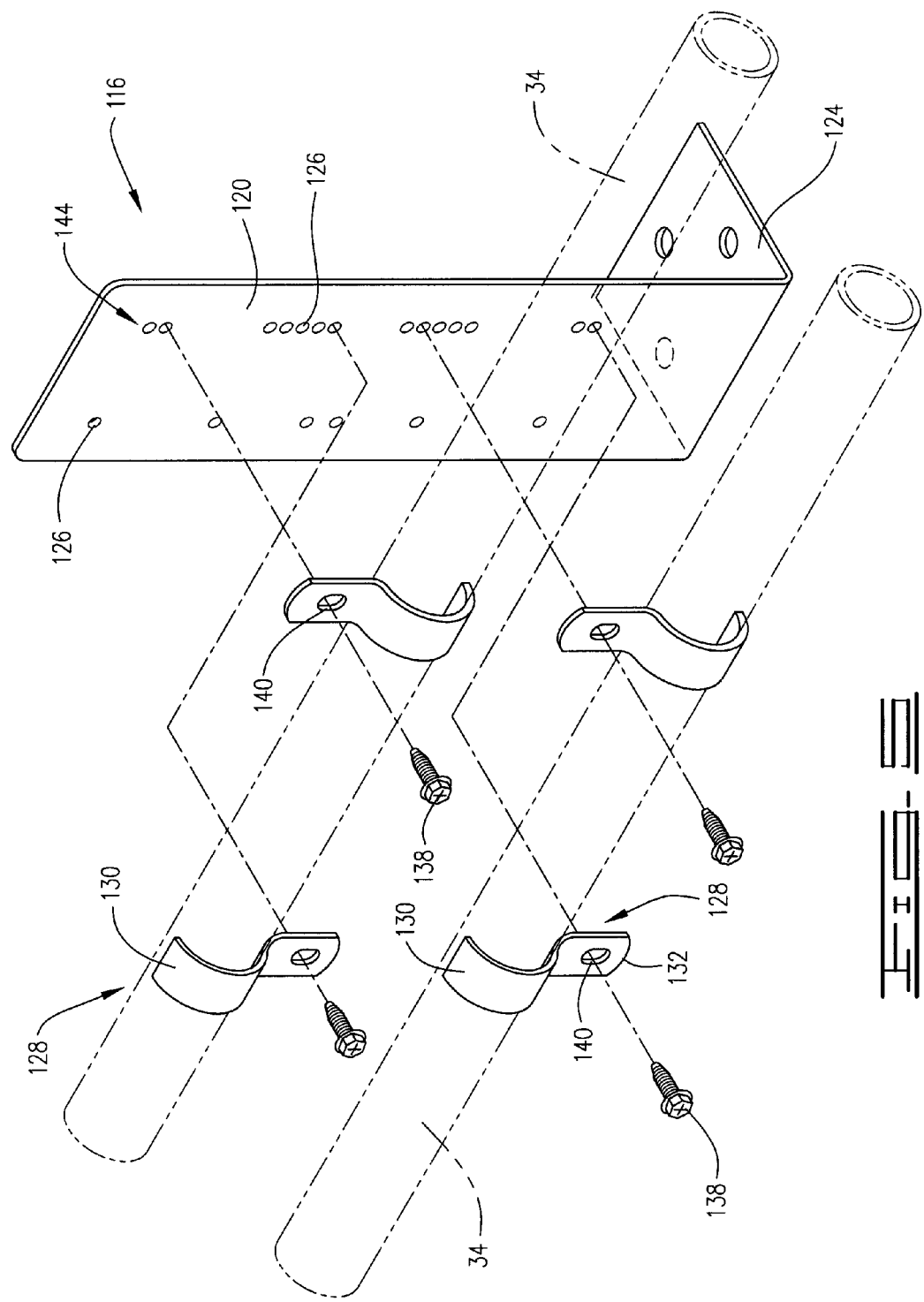
FIG. 5 is a perspective view of a strapping bracket for use in combination with the mounting bracket, illustrating the connection of half inch electrical conduits.

In one embodiment, the back plate 120 includes one column 144 of vertically oriented apertures that are spaced apart from one another such that they cooperate with half inch straps 128 fabricated to receive and retain half inch electrical conduits 34 (see FIG. 5). Additionally, the back plate 120 includes an additional column 148 of vertically oriented apertures that are spaced apart from one another such that they cooperate with three quarter inch straps 128 fabricated to receive and retain three quarter inch electrical conduits 34 (see FIG. 6).

In operation, the frame wall 18 is assembled by joining the top plate 22, bottom plate and wall studs 30 together. Before joining the electrical junction boxes 14 to the frame wall 18, the punch outs 50 of the electrical junction box 14 are depressed to remove the blanks 58 in order to reveal the apertures 62 for receiving the electrical conduits 34. Next, the electrical junction boxes 14 and the electrical conduits 34 are "roughed in" by attaching one or more mounting brackets 10 along the top plate 22 via fasteners 108 inserted through apertures 104 of the securement plate 80 into the top plate 22 at each location where the electrical conduits 34 should travel downwardly to interface with an electrical junction box 14 or another electrical fixture such as an outlet or the like.

Once the mounting brackets 10 are attached along the top plate 22, the electrical junction boxes 14 are joined to the mounting brackets 10 by aligning the apertures 60 of the base plate 42 of the electrical junction box 14 with the apertures 92 of the back plate 42 of the mounting bracket 10 and securing them together with one or more fasteners 96.

Next, the top plate 22 is modified to include one or more apertures 112 to allow for passage of the electrical conduits 34 downwardly from the electrical junction box 14. Then the electrical conduits 34 are joined with the electrical junction box 14 by inserting a portion of the end of the electrical conduit 34 into the apertures 62 of the base plate 42 of the electrical junction box 14. It will be understood that the electrical conduits 34 extending from the electrical junction box 14 downwardly to an additional electrical junction box 14 will be passed through one of the apertures 112 fabricated into the top plate 22.

If needed, one or more strapping brackets 116 may be joined to the top plate 22 or wall studs 30 at predetermined distances to support the weight of the electrical conduits 34 as they extend along the top plate 22 or wall studs 30. The strapping brackets 116 eliminate the need to attach the electrical conduits 34 to the top plate 22 or wall studs 34 and thus eliminate the need to bend or otherwise shape the electrical conduits 34 to interface with the electrical junction boxes 14. The strapping brackets 116 are joined to the top plate 22 via fasteners 132 inserted through the apertures 136 of the securement plate 124 and into the top plate 22 or wall studs 30. The electrical conduits 34 are joined to the strapping brackets 116 via straps 128. More specifically, the arcuate portion 130 of the strap 128 is placed around the electrical conduit 34 and a fastener 138 is inserted through aperture 140 of the connector tab 132 into one of the apertures 126 of the columns of vertically oriented apertures 144 or 148 based upon on the diameter of the electrical conduit 34 and the size of the strap 128. It will be understood that the strap 128 may be joined to the strapping bracket 116 such that the connector tab 132 of the strap 128 is disposed above or below the electrical conduit 34.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An apparatus, comprising:
 a frame wall comprising a top plate having at least one aperture extending therethrough, a bottom plate, and at least one wall stud extending between the top plate and the bottom plate;
 a mounting bracket, comprising:
  a back plate;
  a securement plate extending substantially perpendicularly from the back plate, the securement plate having an open-sided notch; and
  at least one fastener disposed through the aperture of the securement plate and secured to the top plate so as to connect the securement plate to the top plate with the open sided notch of the securement plate in alignment with the aperture of the top plate;
 an electrical junction box having a back plate and a plurality of sidewalls extending from the back plate, the back plate of the electrical junction box connected directly to the back plate of the mounting bracket in a face-to-face, parallel relationship such that the electrical junction box is spaced a distance from the top plate of the frame wall;
 a first electrical conduit extending from one of the sidewalls of the electrical junction box, through the open sided notch of the securement plate, and through the aperture of the top plate of the frame wall in an unbent state;
 a strapping bracket, comprising:
  a back plate;
  a securement plate extending substantially perpendicularly from the back plate, the securement plate having at least one aperture; and
  at least one fastener disposed through the aperture of the securement plate of the strapping bracket and secured to the top plate so as to connect the securement plate of the strapping bracket to the top plate of the frame wall;
 a second electrical conduit extending from one of the sidewalls of the electrical junction box; and
 at least one strap disposed about the second electrical conduit and secured to the back plate of the strapping bracket in such a way that the second electrical conduit is supported a distance away from the top plate of the frame wall by the strapping bracket in an unbent state.

2. The apparatus of claim 1, wherein the back plate of the strapping bracket and the back plate of the mounting bracket are substantially co-planar to one another.

3. The apparatus of claim 1, wherein the back plate of the mounting bracket includes one or more notches that allow one or more electrical conduits to interface with the back plate of the electrical junction box.

4. The apparatus of claim 1, wherein the back plate of the mounting bracket is sized to correspond to the back plate of the electrical junction box.

5. The apparatus of claim 1, wherein a bottom portion of the back plate of the mounting bracket is flared and the securement plate extends perpendicularly from the bottom portion of the back plate such that the securement plate is wider than at least a portion of the back plate of the mounting bracket.

6. The apparatus of claim 1, wherein the back plate of the mounting bracket has an open-sided notch that allows an electrical conduit to interface with the back plate of the electrical junction box at a center point of the back plate of the electrical junction box.

\* \* \* \* \*